United States Patent
Tsou et al.

(10) Patent No.: US 9,207,762 B2
(45) Date of Patent: Dec. 8, 2015

(54) METHOD AND APPARATUS FOR MARKING ELECTRONIC DOCUMENT

(71) Applicant: UTECHZONE CO., LTD., New Taipei (TW)

(72) Inventors: Chia-Chun Tsou, New Taipei (TW); Po-Tsung Lin, New Taipei (TW); Chia-Wen Kao, New Taipei (TW)

(73) Assignee: UTECHZONE CO., LTD, New Taipei (TW)

( * ) Notice: Subject to any disclaimer, the term of this patent is extended or adjusted under 35 U.S.C. 154(b) by 4 days.

(21) Appl. No.: 14/251,648

(22) Filed: Apr. 14, 2014

(65) Prior Publication Data

US 2015/0116201 A1    Apr. 30, 2015

(30) Foreign Application Priority Data

Oct. 25, 2013  (TW) .............................. 102138755 A (51) Int. Cl.
*G06F 3/0483*  (2013.01)
*G06F 3/01*  (2006.01)
*G06F 3/00*  (2006.01)

(52) U.S. Cl.
CPC ................ *G06F 3/013* (2013.01); *G06F 3/005* (2013.01); *G06F 3/012* (2013.01)

(58) Field of Classification Search
CPC ......... G06F 3/012; G06F 3/013; G06F 3/017; G06F 3/01; G06F 3/0483
USPC ....................................................... 345/156
See application file for complete search history.

(56) References Cited

U.S. PATENT DOCUMENTS

| | | | | |
|---|---|---|---|---|
| 5,311,879 | A | * | 5/1994 | Yamada ................. A61B 3/113 600/558 |
| 6,954,193 | B1 | * | 10/2005 | Andrade .............. G09G 3/3611 345/204 |
| 7,429,108 | B2 | | 9/2008 | Rosenberg |
| 2006/0256083 | A1 | * | 11/2006 | Rosenberg ............. G06F 3/013 345/156 |
| 2008/0143674 | A1 | * | 6/2008 | Molander et al. ............ 345/157 |
| 2009/0135849 | A1 | | 5/2009 | Alkove et al. |
| 2010/0182232 | A1 | * | 7/2010 | Zamoyski ............... G06F 3/013 345/157 |
| 2012/0131491 | A1 | * | 5/2012 | Lee .............................. 715/776 |

(Continued)

FOREIGN PATENT DOCUMENTS

TW    I343015    6/2011
TW    201201087    1/2012

OTHER PUBLICATIONS

"Office Action of Taiwan Counterpart Application", issued on Dec. 29, 2014, p. 1-p. 7.

*Primary Examiner* — Aneeta Yodichkas
*Assistant Examiner* — Chineyere Wills-Burns
(74) *Attorney, Agent, or Firm* — Jianq Chyun IP Office (57) ABSTRACT

A method and an apparatus for marking electronic document are provided. An image sequence of a user is captured by an image capturing unit, and an eye tracking procedure, a nod detecting procedure and a blink detecting procedure are executed for analyzing the image sequence. A first position on the electronic document where a current sightline of the user falls when the user performs a first specific action is obtained, and a marking action is executed for marking the electronic document along with a movement trajectory of the user's eyes starting from the first position. A second position on the electronic document where the current sightline falls when the user performs a second specific action is obtained, and the marking action is finished at the second position.

10 Claims, 4 Drawing Sheets

(56) References Cited

U.S. PATENT DOCUMENTS

| | | | |
|---|---|---|---|
| 2012/0293406 A1* | 11/2012 | Park et al. | 345/156 |
| 2013/0293488 A1* | 11/2013 | Na et al. | 345/173 |
| 2013/0300654 A1* | 11/2013 | Seki | G06F 3/013 345/156 |
| 2014/0009395 A1* | 1/2014 | Ku et al. | 345/157 |

* cited by examiner

METHOD AND APPARATUS FOR MARKING ELECTRONIC DOCUMENT

CROSS-REFERENCE TO RELATED APPLICATION

This application claims the priority benefit of Taiwan application serial no. 102138755, filed on Oct. 25, 2013. The entirety of the above-mentioned patent application is hereby incorporated by reference herein and made a part of this specification.

BACKGROUND

1. Technical Field

The invention relates to a method and an apparatus for browsing an electronic document. Particularly, the invention relates to a method and an apparatus for marking electronic document.

2. Related Art

Along with digitization of information, more and more conventional information interfaces are replaced by electronic products. For example, digital photo frames and digital cameras are used to replace conventional photos and films, and electronic products such as personal digital assistants (PDAs), smart phones, readers, etc. become document reading platforms of a new generation. A user can store a plurality of electronic documents such as e-books, etc. in a same portable electronic product to avoid inconvenience of carrying a plurality of conventional paper books. Moreover, the user can read the e-books stored in the portable electronic product at any time.

A plurality of methods for controlling the e-books has been developed. For example, U.S. Pat. No. 7,429,108 provides an electronic reading recorder using a gaze-tracking application, which helps the user seeking a paragraph read last time.

SUMMARY

The invention is directed to a method and an apparatus for marking electronic document, by which the electronic document is marked along with a movement trajectory of user's eyes through a nod action or a blink action.

The invention provides a method for marking electronic document, which includes following steps. An electronic document is displayed in a display unit. An image sequence of a user is captured by an image capturing unit. An eye tracking procedure, a nod detecting procedure and a blink detecting procedure are executed to analyze the image sequence, wherein the eye tracking procedure is configured to track a movement trajectory of eyes of the user, and the nod detecting procedure and the blink detecting procedure are configured to detect whether the user performs a first specific action or a second specific action. A first position on the electronic document where a current sightline of the user falls is obtained through the eye tracking procedure when detecting the user performs the first specific action. A marking action is executed for marking the electronic document along with the movement trajectory of the user's eyes starting from the first position. A second position on the electronic document where the current sightline of the user falls is obtained through the eye tracking procedure when detecting the user performs the second specific action, and the marking action is finished at the second position.

The invention provides an apparatus for marking electronic document, which includes a display unit, an image capturing unit, a storage unit and a processing unit. The display unit is configured to display an electronic document. The image capturing unit is configured to capture an image sequence of a user. The storage unit is configured to store the electronic document and the image sequence. The processing unit is coupled to the display unit, the image capturing unit and the storage unit, and is configured to execute an eye tracking module, a nod detecting module and a blink detecting module to analyze the image sequence, wherein the eye tracking module is configured to track a movement trajectory of eyes of the user, and the nod detecting module and the blink detecting module are configured to detect whether the user performs a first specific action or a second specific action. The eye tracking module obtains a first position on the electronic document where a current sightline of the user falls when detecting that the user performs the first specific action, and the processing unit activates a marking module to execute a marking action for marking the electronic document along with the movement trajectory of the user's eyes starting from the first position. The eye tracking module obtains a second position on the electronic document where the current sightline of the user falls when detecting that the user performs the second specific action, and the marking module finishes the marking action at the second position.

In an embodiment of the invention, the apparatus further includes a correction module. The correction module sequentially receives a plurality of correction images, where the correction images are respectively obtained as the user views a plurality of correction points of the display unit. Moreover, the correction module obtains a reference correction parameter according to two bright spot positions of an eye area in each of the correction images, where the two bright spot positions are formed when the image capturing unit captures each of the correction images. The correction module generates a coordinate transformation matrix according to a perspective transformation method based on the correction images, where the coordinate transformation matrix is used for transforming a coordinate position of the eye area into a coordinate position of the display unit.

In an embodiment of the invention, the eye tracking module detects the eye area of a current image in the image sequence to obtain a pupil position in the current image; obtains a comparison correction parameter according to the two bright spot positions of the eye area of the current image; obtains a dynamic compensation parameter according to the reference correction parameter and the comparison correction parameter; calculates eye movement coordinates according to the pupil position in the current image, the dynamic compensation parameter and one of the two bright spot positions; transforms the eye movement coordinates into sightline falling coordinates corresponding to the display unit by using the coordinate transformation matrix; and records the sightline falling coordinates.

In an embodiment of the invention, the first specific action and the second specific action respectively include at least one of a nod action and a blink action, and the second specific action is the same or different to the first specific action. The marking action includes at least one of actions of adjusting brightness, adding a bottom line and adding a background color.

In an embodiment of the invention, the electronic document includes a plurality of segments, and the marking module executes the corresponding marking action to each of the segments according to a viewing frequency of each of the segments.

According to the above descriptions, the electronic document is marked along with a movement trajectory of user's eyes through a nod action or a blink action. In this way, based on the eye tracking, the user can perform corresponding operations without using the hands, which is very convenient.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
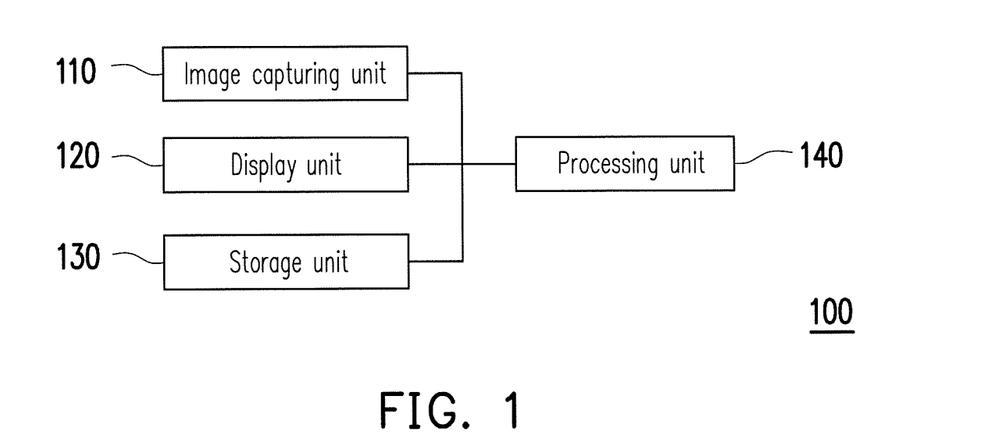
FIG. 1 is a block diagram of an apparatus for marking electronic document according to an embodiment of the invention.

FIG. 1 is a block diagram of an apparatus for marking electronic document according to an embodiment of the invention. Referring to FIG. 1, the apparatus 100 for marking electronic document includes an image capturing unit 110, a display unit 120, a storage unit 130 and a processing unit 140. The processing unit 140 is coupled to the image capturing unit 110, the display unit 120 and the storage unit 130.

The image capturing unit 110 is, for example, a video camera or a camera, which has a charge coupled device (CCD) lens, a complementary metal oxide semiconductor transistor (CMOS) lens, or an infrared lens. The image capturing unit 110 is used for capturing an image sequence of the user.

The display unit 120 is, for example, a liquid crystal display (LCD), a plasma display, a vacuum fluorescent display, a light-emitting diode (LED) display, a field emission display (FED) and/or other suitable types of displays, which is not limited by the invention.

The storage unit 130 is, for example, any type of a fixed or removable random access memory (RAM), a read-only memory (ROM), a flash memory, a hard disk or other similar devices or a combination of the above devices. The storage unit 130 includes a plurality of electronic documents, and can temporarily store the image sequence captured by the image capturing unit 110.

The processing unit 140 is, for example, a central processing unit (CPU), or other programmable general-purpose or special-purpose microprocessor, a digital signal processor (DSP), a programmable controller, an application specific integrated circuit (ASIC), a programmable logic device (PLD) or other similar devices or a combination of the above devices.

The apparatus 100 for marking electronic document is, for example, an electronic apparatus such as a smart phone, a reader, a tablet PC, a personal computer, etc. The image capturing unit 110 (for example, a front camera) is, for example, disposed at a side of the display unit 120 (for example, a touch screen), and when the display unit 120 displays an electronic document, the image capturing unit 110 captures an image sequence of the user reading the electronic document. Thereafter, the processing unit 140 executes an eye tracking procedure, a nod detecting procedure and a blink detecting procedure to analyze the captured image sequence.

For example, the storage unit 130 includes a computer program product used for marking the electronic document. The computer program product comprises a plurality of program instructions (for example, an organization chart establishing program instruction, a table approving program instruction, a setting program instruction, and a deployment program instruction, etc), and these program instructions are loaded into an electronic apparatus such as the apparatus 100 for marking electronic document, etc. and executed by the same to accomplish the function of marking the electronic document.

Figure 2:
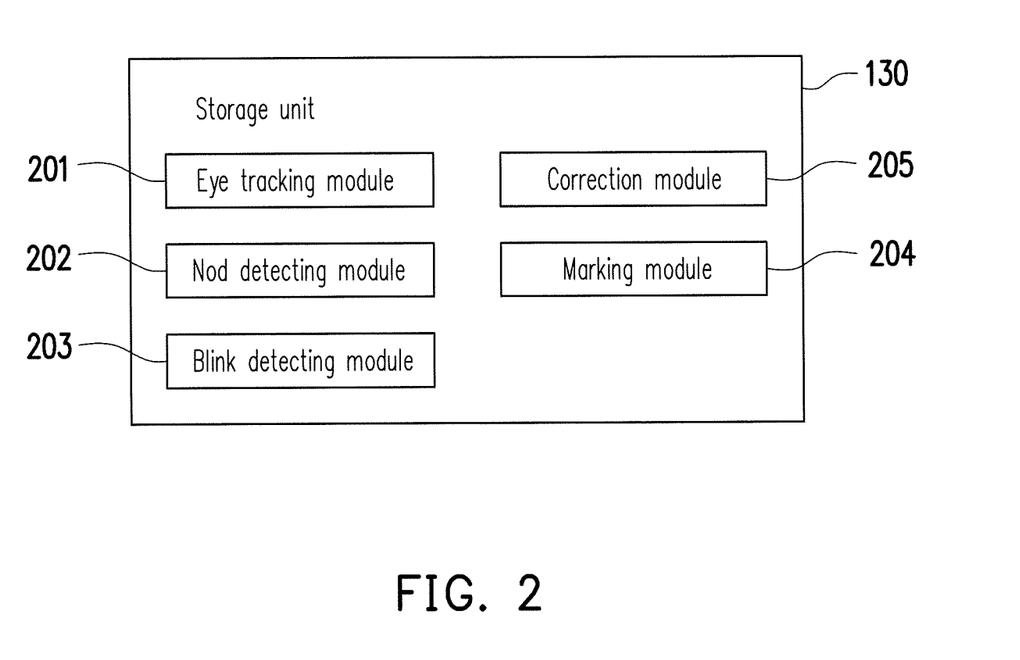
FIG. 2 is a block diagram of a storage unit according to an embodiment of the invention.

FIG. 2 is a block diagram of a storage unit according to an embodiment of the invention. Referring to FIG. 2, the storage unit 130 includes an eye tracking module 201, a nod detecting module 202, a blink detecting module 203, a marking module 204 and a correction module 205. The above modules are, for example, program instructions written in a computer programming language, and the program instructions include a plurality of commands, and the processing unit 140 is used to execute the program instructions to accomplish the function of marking the electronic document. In other embodiments, the aforementioned modules can also be hardware composed of one or a plurality of transistors or logic gates, etc., which are coupled to the processing unit 140 and driven by the processing unit 140.

The eye tracking module 201 executes the eye tracking procedure to the image sequence for tracking a movement trajectory of eyes of the user. The correction module 205 is used for performing a correction procedure before the eye tracking procedure is executed. For example, before an eye position is detected, the correction module 205 sequentially receives a plurality of correction images, and generates a coordinate transformation matrix according to the correction images. The correction images are respectively obtained as the user views a plurality of correction points of the display unit 120. For example, 4 points of an upper left point, an upper right point, a lower left point and a lower right point of the display unit 120 are taken as the correction points. When the correction procedure is performed, the display unit 120 prompts the user to view the aforementioned 4 correction points, so as to obtain 4 correction images. The correction module 205 obtains a reference correction parameter according to two bright spot positions of an eye area in each of the correction images.

Figure 3:
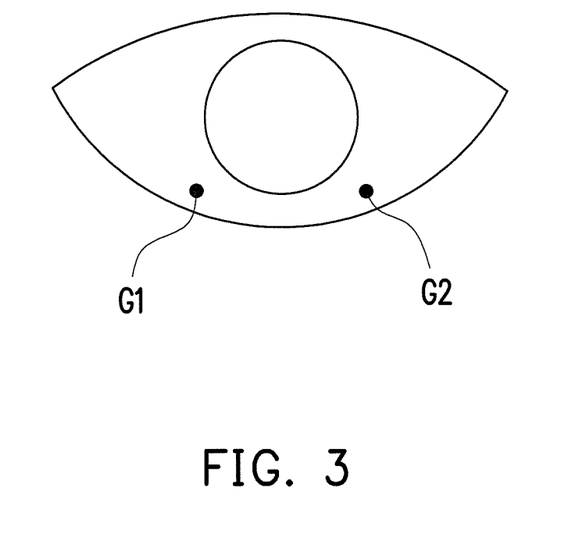
FIG. 3 is a schematic diagram of an eye area according to an embodiment of the invention.

FIG. 3 is a schematic diagram of an eye area according to an embodiment of the invention. The eye area of FIG. 3 includes two bright spot positions G1 and G2. The two bright spot positions G1 and G2 are formed when a light emitted by a light emitting module of the image capturing unit 110 is reflected by the eye. The reference correction parameter is obtained according to the two bright spot positions G1 and G2 of the eye area in each of the correction images. The reference correction parameter is, for example, a vector based on the bright spot positions G1 and G2. Thereafter, the correction module 205 generates a coordinate transformation matrix according to a perspective transformation method based on the correction images, where the coordinate transformation matrix is used for transforming a coordinate position of the eye area into a coordinate position of the display unit 120.

The eye tracking module 201 detects the eye area of a current image in the image sequence to obtain a pupil position and two bright spot positions (which are referred to as bright spot positions G1' and G2') in the current image. Moreover, the eye tracking module 201 obtains a comparison correction parameter according to the bright spot positions G1' and G2' of the current image, so as to obtain a dynamic compensation parameter (C3) according to the reference correction parameter (C1) and the comparison correction parameter (C2). For example, the dynamic compensation parameter is a ratio between the reference correction parameter and the comparison correction parameter, i.e. C3=C2/C1. Thereafter, the eye tracking module 201 calculates eye movement coordinates according to the bright spot position G1' (or the bright spot position G2') and the pupil position (for example, coordinates of the center of the pupil) in the current image and the dynamic compensation parameter. For example, the eye movement coordinates are (X', Y'). The eye tracking module 201 transforms the eye movement coordinates (X', Y') into sightline falling coordinates corresponding to the display unit 120 (for example, sightline falling coordinates (Xs, Ys)) by using the coordinate transformation matrix and records the sightline falling coordinates (Xs, Ys). In this way, the movement trajectory of the user's eyes is obtained according to a plurality of recorded sightline falling coordinates.

The nod detecting module 202 is used for executing a nod detecting procedure to the image sequence to detect whether the user performs a nod action. The blink detecting module 203 is used for executing a blink detecting procedure to the image sequence to detect whether the user performs a blink action. The nod detecting module 202 and the blink detecting module 203 can detect whether the user performs a first specific action or a second specific action. The first specific action includes both of or one of the blink action and the nod action.

For example, the nod detecting module 202 detects a nostril area of the user's face in the image to obtain nostril position information, and determines whether the user performs the nod action by comparing the nostril position information of two adjacent images (or more than two images). Moreover, the blink detecting module 203 detects an eye object in the image, for example, the blink detecting module 203 searches upwards for the eye object based on the nostril area. After the eye object is obtained, the blink detecting module 203 determines whether the user' eye is closed based on a size of the eye object.

Figure 4:
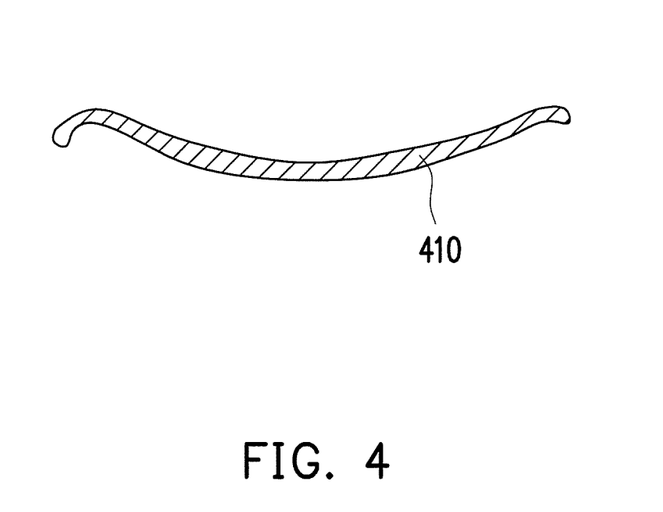
FIG. 4 is a schematic diagram of an eye object according to an embodiment of the invention

For example, FIG. 4 is a schematic diagram of an eye object according to an embodiment of the invention, and FIG. 4 illustrates a close state of the eye object. For example, the eye object 410 shown in FIG. 4 is obtained through processing of noise removing, edge sharpening, binarization processing, edge sharpening again, etc. on the image of the eye area. If a height of the eye object 410 is smaller than a height threshold (for example, a range of the height threshold is between 5-7 pixels), and a width of the eye object 410 is greater than a width threshold (for example, a range of the width threshold is between 60-80 pixels), it is determined that the eye object 410 is in the close state. If the above conditions are not met, the eye object 410 is determined to be in an open state. In this way, the blink detecting module 203 can detect whether the user performs the blink action.

The marking module 204 is used for executing a marking action. The marking action is, for example, to adjust brightness, add a bottom line or add a background color, etc. After the marking module 204 is activated, the marking module 204 executes the marking action along with the movement trajectory of the eyes.

Detailed steps of the method for marking electronic document are described below with reference of the apparatus 100 for marking electronic document.

Figure 5:
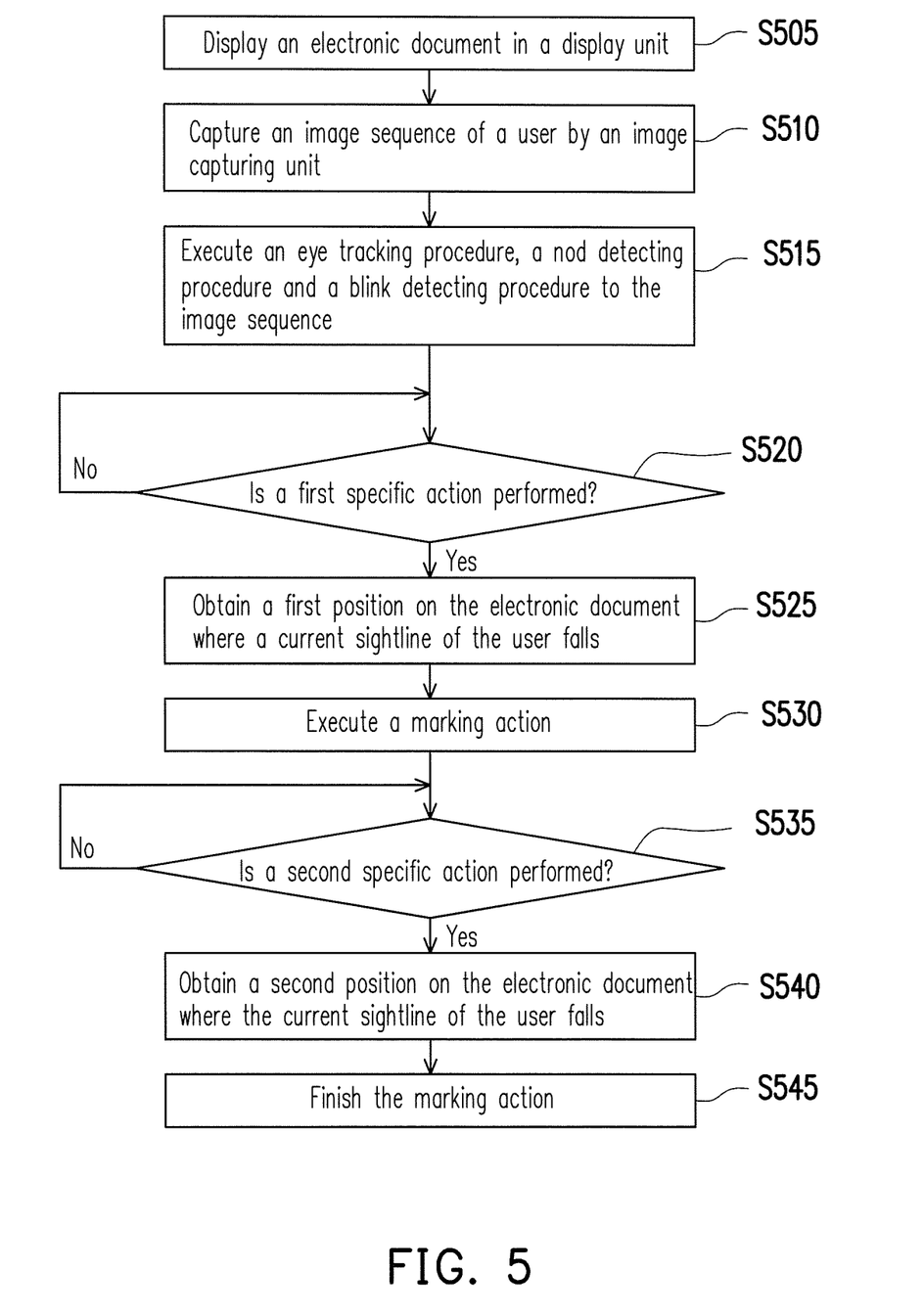
FIG. 5 is a flowchart illustrating a method for marking electronic document according to an embodiment of the invention.
Figure 6:
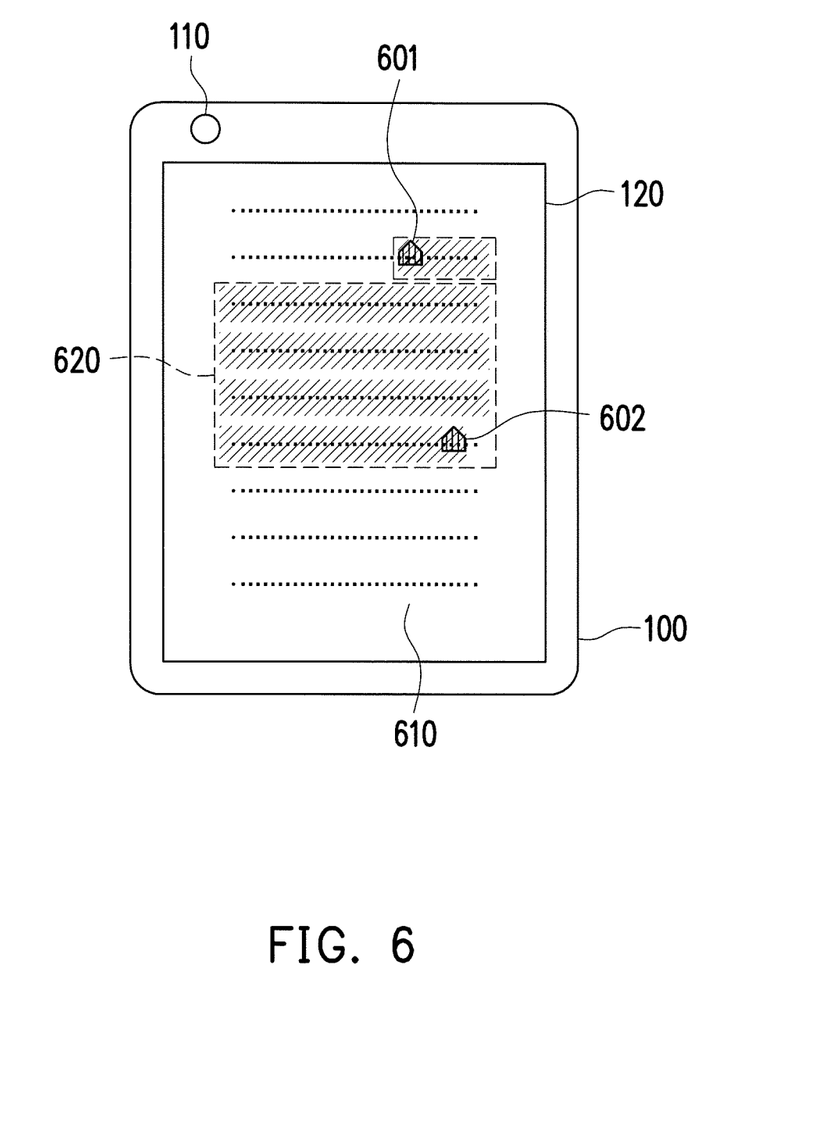
FIG. 6 is a schematic diagram of an apparatus for marking electronic document according to an embodiment of the invention.

FIG. 5 is a flowchart illustrating a method for marking electronic document according to an embodiment of the invention. In step S505, an electronic document is displayed in the display unit 120, as that shown in FIG. 6. FIG. 6 is a schematic diagram of an apparatus for marking electronic document according to an embodiment of the invention. In the present embodiment, the apparatus 100 for marking electronic document is a tablet PC, and the image capturing unit 110 is disposed at a side of the display unit 120. The display unit 120 displays an electronic document 610.

Then, in step S510, the image capturing unit 110 is used to capture an image sequence of a user. Namely, the image capturing unit 110 captures an image of the user viewing the electronic document 610. Then, in step S515, the eye tracking procedure, the nod detecting procedure and the blink detecting procedure are executed to the image sequence. Namely, the eye tracking module 201, the nod detecting module 202 and the blink detecting module 203 are respectively used to analyze the image sequence, wherein the eye tracking module 201 is used to track a movement trajectory of eyes of the user, and the nod detecting module 202 and the blink detecting module 203 are used to detect whether the user performs a first specific action or a second specific action.

The first specific action is, for example, to sequentially execute the nod action once and the blink action twice within two seconds, and the second specific action is, for example, to sequentially execute the blink action once and the nod action once within two seconds. However, the above pattern is only an example, and the invention is not limited thereto. Moreover, the first specific action and the second specific action can be set to the same actions, and are not limited to be different actions.

Then, in step S520, the processing unit 140 determines whether the user performs the first specific action. If the first specific action is not performed, the follow-up steps are not performed, and if the first specific action is performed, a step S525 is executed.

In the step S525, the eye tracking module obtains a first position 601 on the electronic document 610 where a current sightline of the user falls. Namely, the first position 601 is a gazing position of the user when the user performs the first specific action. Then, in step S530, the processing unit 140 activates the marking module 204 to execute the marking action for marking the electronic document 610 along with the movement trajectory of the user's eyes starting from the first position 601, for example, a marking range 620 of FIG. 6 shown in oblique lines.

Then, in step S535, the processing unit 140 determines whether the user performs the second specific action. If the second specific action is not performed, the follow-up steps are not performed, and the marking module 204 continues to execute the marking action to mark the electronic document 610 along with the movement trajectory of the user's eyes, and if the second specific action is performed, a step S540 is executed.

In step S540, the eye tracking module 201 obtains a second position 602 on the electronic document 610 where the sightline of the user falls. Namely, the second position 602 is a gazing position of the user when the user performs the second specific action. Finally, in step S545, the marking module 204 finishes the marking action at the second position 602. As that shown in FIG. 6, the marking range 620 is started from the first position 601 and ended at the second position 602.

For example, when the user finishes reading a certain content of interest, the user can move the sightline to a start point of the content of interest, and sequentially performs the nod action once and the blink action twice within two seconds (the first specific action) in front of the image capturing unit 110, such that the apparatus 100 for marking electronic document activates the marking action. Then, the user moves the sightline to browse the content of interest, and when the user browses an end point, the user performs the blink action once and the nod action once (the second specific action) within two seconds, such that the apparatus 100 for marking electronic document ends the marking action. In this way, marking of the content of interest is accomplished.

In other embodiments, if the first specific action and the second specific action are the same, for example, are all to quickly perform the blink action twice, the two quick blink actions detected for the first time are taken as the first specific action, and the two quick blink actions detected for the second time are taken as the second specific action.

Moreover, the content of the electronic document 610 can be divided into a plurality of segments (for example, the electronic document 610 is segmented according to chapters or paragraphs), and when the user browses the electronic document 610, a viewing frequency of each segment is recorded, and the corresponding marking action is executed to each of the segments according to a viewing frequency of each of the segments. For example, if the viewing frequency of a segment exceeds a first predetermined frequency (3 times), a background color of the segment is set to a yellow color. If the viewing frequency of a segment exceeds a second predetermined frequency (5 times), a background color of the segment is set to a blue color. The above pattern is only an example, and the invention is not limited thereto.

In summary, the electronic document is automatically marked along with a movement trajectory of user's eyes through the nod action or the blink action based the eye tracking, such that the user can perform corresponding operations without using the hands, and mark the paragraph of interest, by which convenience in assisting reading is enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for marking electronic document, comprising:
performing a correction procedure before an eye tracking procedure is executed, wherein the correction procedure includes sequentially receiving a plurality of correction images, and generating a coordinate transformation matrix according to the correction images;
displaying an electronic document in a display unit;
capturing an image sequence of a user by an image capturing unit;
executing the eye tracking procedure, a nod detecting procedure and a blink detecting procedure to analyze the image sequence, wherein the eye tracking procedure is configured to track a movement trajectory of eyes of the user, and the nod detecting procedure and the blink detecting procedure are configured to detect whether the user performs a first specific action or a second specific action; wherein the eye tracking procedure includes:
detecting an eye area of a current image in the image sequence to obtain a pupil position in the current image;
obtaining a comparison correction parameter according to two bright spot positions of the eye area of the current image;
obtaining a dynamic compensation parameter according to a reference correction parameter and the comparison correction parameter, wherein the reference correction parameter is obtained based on the two bright spot positions of the eye area in each of the correction images;
calculating eye movement coordinates according to the pupil position in the current image, the dynamic compensation parameter and one of the two bright spot positions of the current image;
transforming the eye movement coordinates into sightline falling coordinates corresponding to the display unit by using the coordinate transformation matrix; and
recording the sightline falling coordinates;
obtaining a first position on the electronic document where a current sightline of the user falls through the eye tracking procedure when detecting the user performs the first specific action;
executing a marking action for marking the electronic document along with the movement trajectory of the user's eyes starting from the first position;
obtaining a second position on the electronic document where the current sightline of the user falls through the eye tracking procedure when detecting the user performs the second specific action; and
finishing the marking action at the second position.

2. The method for marking electronic document as claimed in claim 1, wherein
the correction images are respectively obtained as the user views a plurality of correction points of the display unit;
the two bright spot positions are formed when the image capturing unit captures each of the correction images; and
the coordinate transformation matrix is used for transforming a coordinate position of the eye area into a coordinate position of the display unit.

3. The method for marking electronic document as claimed in claim 1, wherein the first specific action and the second specific action respectively comprise at least one of a nod action and a blink action, and the second specific action is the same or different to the first specific action.

4. The method for marking electronic document as claimed in claim 1, wherein the marking action comprises at least one of actions of adjusting brightness, adding a bottom line and adding a background color.

5. The method for marking electronic document as claimed in claim 1, wherein the electronic document comprises a plurality of segments, and the method further comprises:
executing the corresponding marking action to each of the segments according to a viewing frequency of each of the segments.

6. An apparatus for marking electronic document, comprising:
a display unit, displaying an electronic document
an image capturing unit, capturing an image sequence of a user;
a storage unit, storing the electronic document and the image sequence; and
a processing unit, coupled to the display unit, the image capturing unit and the storage unit, and executing a correction module, an eye tracking module, a nod detecting module and a blink detecting module to analyze the image sequence, wherein the correction module is configured to sequentially receive a plurality of correction images, and generate a coordinate transformation matrix according to the correction images; the eye tracking module is configured to track a movement trajectory of eyes of the user, and the nod detecting module and the blink detecting module are configured to detect whether the user performs a first specific action or a second specific action, wherein the eye tracking module detects an eye area of a current image in the image sequence to obtain a pupil position in the current image; obtains a comparison correction parameter according to two bright spot positions of the eye area of the current image; obtains a dynamic compensation parameter according to a reference correction parameter and the comparison correction parameter, wherein the reference correction parameter is obtained based on the two bright spot positions of the eye area in each of the correction images; calculates eye movement coordinates according to the pupil position in the current image, the dynamic compensation parameter and one of the two bright spot positions of the current image; transforms the eye movement coordinates into sightline falling coordinates corresponding to the display unit by using the coordinate transformation matrix; and records the sightline falling coordinates;

wherein the eye tracking module obtains a first position on the electronic document where a current sightline of the user falls when detecting that the user performs the first specific action, and the processing unit activates a marking module to execute a marking action for marking the electronic document along with the movement trajectory of the user's eyes starting from the first position; the eye tracking module obtains a second position on the electronic document where the current sightline of the user falls when detecting that the user performs the second specific action, and the marking module finishes the marking action at the second position.

7. The apparatus for marking electronic document as claimed in claim 6, wherein
the correction images are respectively obtained as the user views a plurality of correction points of the display unit, the two bright spot positions are formed when the image capturing unit captures each of the correction images, and the coordinate transformation matrix is used for transforming a coordinate position of the eye area into a coordinate position of the display unit.

8. The apparatus for marking electronic document as claimed in claim 6, wherein the first specific action and the second specific action respectively comprise at least one of a nod action and a blink action, and the second specific action is the same or different to the first specific action.

9. The apparatus for marking electronic document as claimed in claim 6, wherein the marking action comprises at least one of actions of adjusting brightness, adding a bottom line and adding a background color.

10. The apparatus for marking electronic document as claimed in claim 6, wherein the electronic document comprises a plurality of segments, and the marking module executes the corresponding marking action to each of the segments according to a viewing frequency of each of the segments.

* * * * *